(12) United States Patent
Mitsuda

(10) Patent No.: US 9,624,814 B2
(45) Date of Patent: Apr. 18, 2017

(54) ENGINE DEVICE

(71) Applicant: YANMAR CO., LTD., Osaka (JP)

(72) Inventor: Masataka Mitsuda, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 29 days.

(21) Appl. No.: 14/763,995

(22) PCT Filed: Feb. 14, 2014

(86) PCT No.: PCT/JP2014/053428
§ 371 (c)(1),
(2) Date: Jul. 28, 2015

(87) PCT Pub. No.: WO2014/129392
PCT Pub. Date: Aug. 28, 2014

(65) Prior Publication Data
US 2015/0369109 A1 Dec. 24, 2015

(30) Foreign Application Priority Data
Feb. 19, 2013 (JP) .................................. 2013-030197

(51) Int. Cl.
B60K 13/04 (2006.01)
F01N 13/10 (2010.01)
(Continued)

(52) U.S. Cl.
CPC .............. *F01N 13/10* (2013.01); *B60K 11/04* (2013.01); *B60K 13/04* (2013.01); *B66F 9/075* (2013.01);
(Continued)

(58) Field of Classification Search
CPC  B60K 13/04; B60K 11/04; F01N 3/02; F01N 3/0235; F01N 13/00;
(Continued)

(56) References Cited

U.S. PATENT DOCUMENTS 4,766,983 A * 8/1988 Tamba ................... F01N 13/08
181/204
8,327,627 B2 * 12/2012 Kowada ................. F01N 3/035
60/295

(Continued)

FOREIGN PATENT DOCUMENTS

CN 102187072 A 9/2011
EP 2333260 A1 6/2011
(Continued)

OTHER PUBLICATIONS

Microfilm of the specification and drawings annexed to the request of Japanese Utility Model Application No. 89745/1987 (Laid-open No. 197729/1988) (Kubota Tekko Kabushiki Kaisha), Dec. 20, 1988 (Dec. 20, 1988), entire text; all drawings (Family: none) JPS 63-197729.

(Continued)

*Primary Examiner* — J. Allen Shriver, II
*Assistant Examiner* — Steven Clemmons
(74) *Attorney, Agent, or Firm* — Norris McLaughlin & Marcus, P.A.

(57) ABSTRACT

An engine is disposed below an operator's seat in such a manner that a flywheel housing is located at the front of a traveling machine body. An exhaust gas purification device is disposed behind the engine and below a radiator. The engine is connected, on the left side thereof, to an air cleaner for taking in fresh air, and is connected, on the right side thereof, to an exhaust pipe which is connected to the air inlet side of the exhaust gas purification device.

7 Claims, 14 Drawing Sheets

(51) Int. Cl.
  *B60K 11/04* (2006.01)
  *E02F 9/08* (2006.01)
  *F01N 13/18* (2010.01)
  *B66F 9/075* (2006.01)
  *E02F 9/16* (2006.01)
  *E02F 9/18* (2006.01)
  *F01N 3/08* (2006.01)
  *F01N 9/00* (2006.01)
  *B60K 5/02* (2006.01)

(52) U.S. Cl.
  CPC ........ *B66F 9/07595* (2013.01); *E02F 9/0866* (2013.01); *E02F 9/0891* (2013.01); *E02F 9/16* (2013.01); *E02F 9/18* (2013.01); *F01N 3/08* (2013.01); *F01N 13/1805* (2013.01); *B60K 5/02* (2013.01); *B60Y 2200/15* (2013.01); *B60Y 2200/412* (2013.01); *B60Y 2200/415* (2013.01); *F01N 9/002* (2013.01); *F01N 2470/18* (2013.01); *F01N 2590/00* (2013.01)

(58) Field of Classification Search
  CPC ............. F01N 13/1805; F01N 13/1822; F01N 13/1816; F01N 2590/08; F01N 2340/04; B60Y 2202/41; B60Y 2202/415
  See application file for complete search history.

(56) References Cited

U.S. PATENT DOCUMENTS

| | | | | |
|---|---|---|---|---|
| 8,505,499 | B2* | 8/2013 | Hirasawa | B60K 11/04 123/41.01 |
| 8,869,928 | B2* | 10/2014 | Yoshida | F01N 3/0231 180/305 |
| 2011/0154810 | A1* | 6/2011 | Mitsuda | E02F 9/00 60/311 |
| 2011/0192671 | A1 | 8/2011 | Mitsuda et al. | |
| 2013/0319787 | A1* | 12/2013 | Kobayashi | E02F 9/0866 180/309 |

FOREIGN PATENT DOCUMENTS

| | | | | |
|---|---|---|---|---|
| JP | 62-150221 | | 9/1987 | |
| JP | 63-197729 | | 12/1988 | |
| JP | 2000-145430 | | 5/2000 | |
| JP | 2000-314153 | | 11/2000 | |
| JP | WO 2006003713 | A1 * | 1/2006 | ............ B60K 13/04 |
| JP | 2007-182705 | | 7/2007 | |
| JP | WO 2010071082 | A1 * | 6/2010 | ............ B60K 11/04 |
| JP | 2011106311 | A * | 6/2011 | |
| JP | 2013-011109 | | 1/2013 | |
| KR | WO 2014069684 | A1 * | 5/2014 | ............ B60K 5/00 |
| WO | WO-2010/050314 | | 5/2010 | |

OTHER PUBLICATIONS

Microfilm of the specification and drawings annexed to the request of Japanese Utility Model Application No. 38597/1986 (Laid-open No. 150221/1987) (Kubota Tekko Kabushiki Kaisha), Sep. 22, 1987 (Sep. 22, 1987), entire text: all drawings (Family: none).

CD-ROM of the specification and drawings annexed to the request of Japanese Utility Model Application No. 71706/14993 (Laid-open No. 35715/1995) (Komatsu Forklift Co., ltd.), Jul. 4, 1995 (Jul. 4, 1995), paragraphs [0007] to [0008]: fig. 3 to 4 (Family: none).

* cited by examiner

ENGINE DEVICE

TECHNICAL FIELD

The present invention relates to an engine device such as a diesel engine equipped with an exhaust gas purification device, and more specifically to an engine device which is mounted in a work machine such as a wheel loader, a backhoe, or a forklift truck.

BACKGROUND OF THE INVENTION

Conventionally, there is developed a technique of disposing an exhaust gas purification device (diesel particulate filter) in an exhaust path of a diesel engine so as to purify exhaust gas discharged from the engine by an oxidation catalyst, a soot filter, or the like of the exhaust gas purification device (see, for example, Patent Document 1). Further, in recent years, also in a field of work machines such as a construction machine or an agricultural machine, it is required to provide an exhaust gas purification device to a diesel engine used in the machine, as an environmental measure (see, for example, Patent Document 2).

PRIOR ART DOCUMENTS

Patent Document 1: JP-A-2000-145430
Patent Document 2: JP-A-2007-182705

In the case of providing an exhaust gas purification device, if the exhaust gas purification device is simply disposed instead of a silencer (or a muffler) in an exhaust path of the engine, the exhaust gas purification device is much heavier than the silencer. As a result, even if a support structure for a silencer in the construction machine disclosed in Patent Document 2 is utilized as a support structure for an exhaust gas purification device, there is a problem that the exhaust gas purification device cannot be stably assembled. In particular, in a work machine such as a wheel loader, the traveling machine body itself is required to be compact in order to decrease the turning radius for a purpose of preventing contact with surroundings, and hence there is a restriction of an engine mounting space.

In addition, the silencer is supported by the engine in the construction machine of Patent Document 2. In this case, if the exhaust gas purification device is disposed close to the engine in the engine mounting space, high frequency vibration of the engine may be transmitted to the exhaust gas purification device so that the exhaust gas purification device can be damaged.

On the other hand, in the case where the exhaust gas purification device is disposed away from the engine so that the influence of the high frequency vibration of the engine is reduced, a distance from an exhaust manifold of the engine to the exhaust gas purification device is increased. For this reason, temperature of the exhaust gas flowing into the exhaust gas purification device is decreased so that particulate matter contained in the exhaust gas cannot be sufficiently burned and removed. As a result, the particulate matter is deposited in the exhaust gas purification device, and consequently there is a problem that an output of the engine is decreased.

Accordingly, it is an object of the present invention to provide an improved engine device by studying the above-mentioned current situation.

SUMMARY OF THE INVENTION

An engine device is mounted in a work machine in which an operator's seat is disposed on a bonnet disposed in a rear part of a traveling machine body and an engine with an exhaust manifold is disposed in the bonnet. The engine device includes an exhaust gas purification device for purifying exhaust gas of the engine, and the exhaust gas purification device is disposed under the engine. The exhaust manifold of the engine is connected to an exhaust gas inlet side of the exhaust gas purification device via an exhaust pipe.

The engine device includes a counterweight disposed behind the bonnet of the traveling machine body and the exhaust gas purification device for purifying exhaust gas of the engine. The exhaust gas purification device is disposed under between the counterweight and the engine, and a plurality of heat exchangers are disposed to face a cooling fan disposed in a rear part of the engine in a rear part inside the bonnet. The heat exchangers are aligned in an ascending order of heat release amount toward a discharge direction of cooling air by the cooling fan, while the exhaust gas purification device is positioned under the heat exchangers.

The engine device is configured in such a manner that the exhaust gas purification device is positioned so that an exhaust gas flow direction thereof crosses a longitudinal direction of an engine output shaft, and the exhaust gas purification device is connected to a machine body frame of the traveling machine body.

The engine device is configured in such a manner that the exhaust manifold of the engine is connected to the exhaust gas inlet side of the exhaust gas purification device via the exhaust pipe, and the exhaust pipe is partially formed of a flexible tube.

The engine device is configured in such a manner that the exhaust gas purification device is positioned so that an exhaust gas flow direction thereof crosses a longitudinal direction of an engine output shaft, and the exhaust gas purification device is connected to an engine leg attaching part in a rear part of the engine.

The engine device is configured in such a manner that an exhaust gas temperature increasing mechanism for increasing temperature of the exhaust gas flowing to the exhaust gas purification device is disposed in a middle part of the exhaust pipe.

The engine device is configured in such a manner that an air cleaner for cleaning air taken into the engine and the exhaust pipe are disposed respectively on the left and right sides of the heat exchanger in the bonnet.

The engine device is mounted in a work machine in which an operator's seat is disposed on a bonnet disposed in a rear part of a traveling machine body and an engine with an exhaust manifold is disposed in the bonnet, the engine device includes an exhaust gas purification device for purifying exhaust gas of the engine, the exhaust gas purification device is disposed under the engine, and the exhaust manifold of the engine is connected to an exhaust gas inlet side of the exhaust gas purification device via an exhaust pipe. Accordingly, the exhaust gas purification device itself as a heavy object can be used as an assist to a counterweight disposed behind the bonnet. Further, even if a space in the bonnet is small, peripheral devices of the engine device including the exhaust gas purification device can be efficiently arranged.

The engine device includes a counterweight disposed behind the bonnet of the traveling machine body and the exhaust gas purification device for purifying exhaust gas of the engine, the exhaust gas purification device is disposed under between the counterweight and the engine, a plurality of heat exchangers are disposed to face a cooling fan disposed in a rear part of the engine in a rear part inside the bonnet, and the heat exchangers are aligned in an ascending order of heat release amount toward a discharge direction of cooling air by the cooling fan, while the exhaust gas purification device is positioned under the heat exchangers. Accordingly, the cooling air by the cooling fan deprives heat while passing through the heat exchangers, and hence the heat exchangers aligned in an ascending order of heat release amount can be cooled securely and effectively. On the other hand, the cooling air from the cooling fan hardly hits the exhaust gas purification device directly, and hence a temperature decrease of the exhaust gas purification device and the exhaust gas inside the device can be suppressed so that temperature of the exhaust gas can be maintained.

The exhaust gas purification device is positioned so that an exhaust gas flow direction thereof crosses a longitudinal direction of an engine output shaft, and the exhaust gas purification device is connected to a machine body frame of the traveling machine body. Accordingly, by connecting the exhaust gas purification device to the machine body frame that is a strength member of the traveling machine body and is separated from an engine vibration system, the exhaust gas purification device as a heavy object can be supported with high rigidity. By preventing the engine vibration from propagating to the exhaust gas processing device, the exhaust gas processing device can be protected from the engine vibration, so that improvement of durability and longer life of the exhaust gas purification device can be achieved.

The exhaust manifold of the engine is connected to the exhaust gas inlet side of the exhaust gas purification device via the exhaust pipe, and the exhaust pipe is partially formed of a flexible tube. Accordingly, a load on the exhaust pipe connecting the engine and the exhaust gas purification device which belong to different vibration systems can be absorbed by the flexible tube so that damage to the exhaust pipe can be prevented. By preventing the engine vibration from propagating to the exhaust gas purification device directly via the exhaust pipe, the exhaust gas processing device can be protected from the engine vibration, and high effect can be obtained in view of improvement of durability and long life of the exhaust gas purification device.

The exhaust gas purification device is positioned so that an exhaust gas flow direction thereof crosses a longitudinal direction of an engine output shaft, and the exhaust gas purification device is connected to an engine leg attaching part in a rear part of the engine. Accordingly, the exhaust gas purification device can be assembled integrally to the engine, and hence in an engine assembly factory, it is possible to assemble the exhaust gas purification device to the engine before shipping.

An exhaust gas temperature increasing mechanism for increasing temperature of the exhaust gas flowing to the exhaust gas purification device is disposed in a middle part of the exhaust pipe. Accordingly, an active increase of temperature of the exhaust gas by the exhaust gas temperature increasing mechanism can cause the exhaust gas purification device disposed away from the engine to effectively work, and hence deposition of particulate matter in the exhaust gas purification device can be suppressed.

An air cleaner for cleaning air taken into the engine and the exhaust pipe are disposed respectively on the left and right sides of the heat exchanger in the bonnet. Accordingly, it is possible to suppress an influence of heat discharged from the exhaust gas purification device to the air cleaner that is vulnerable to heat.

DESCRIPTION OF THE PREFERRED EMBODIMENTS

With reference to FIGS. 1 to 10, an embodiment of an engine device and a work machine equipped with the engine device according to the present invention is described on the basis of the drawings. Note that in the following description, a wheel loader equipped with a loader device as a work unit is exemplified as the work machine in this embodiment, and details of structure thereof will be described.

Figure 1:
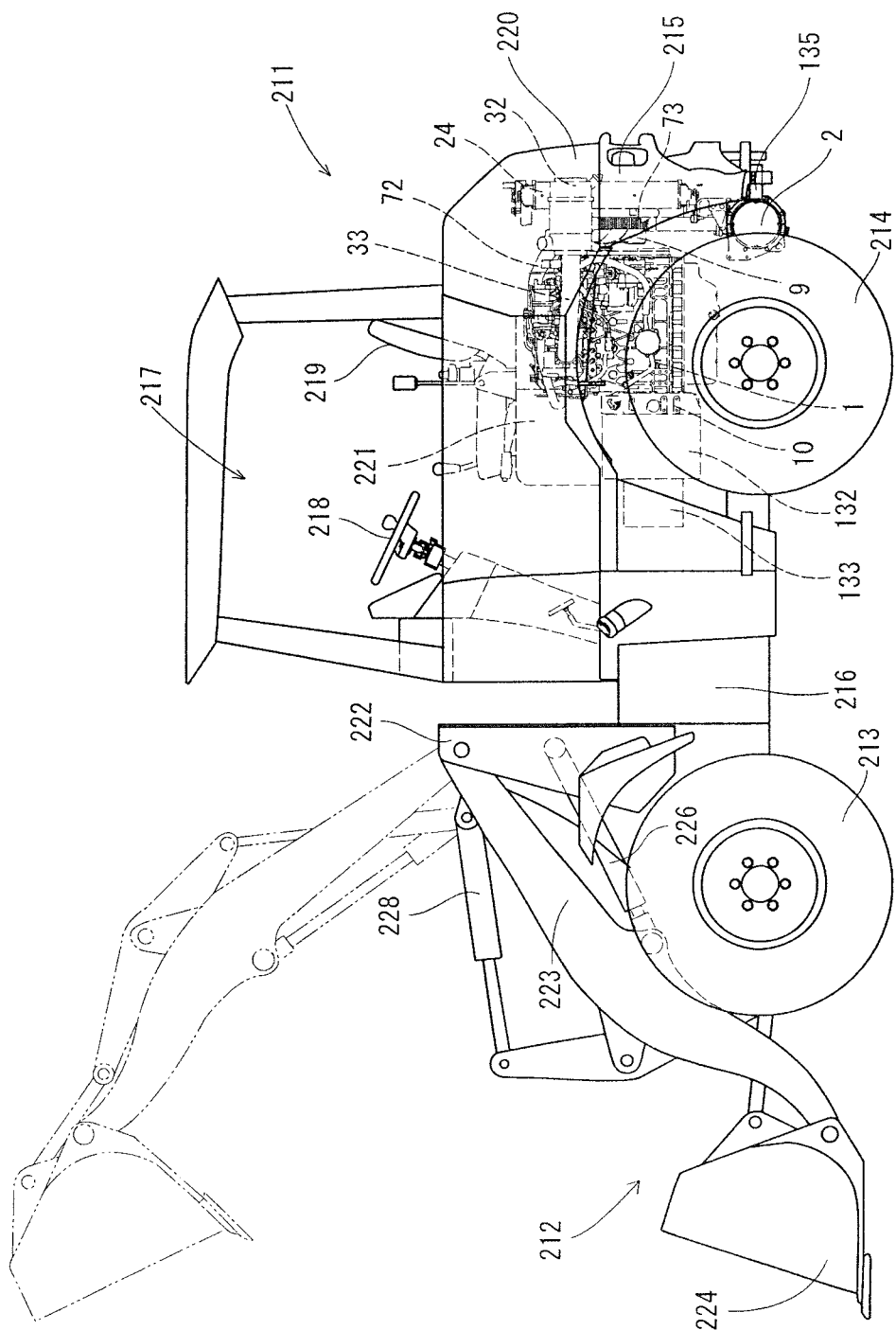
FIG. 1 is a left side view of a wheel loader as an example in an embodiment of a work machine of the present invention.
Figure 2:
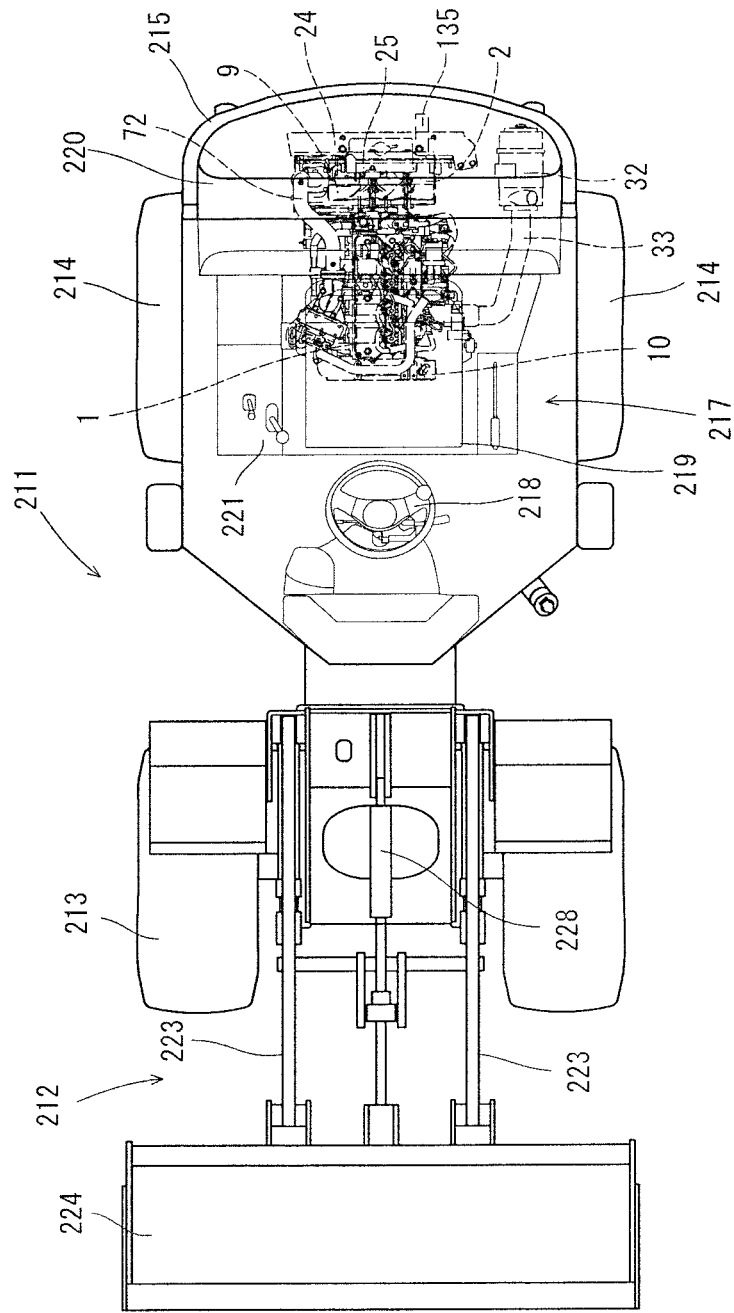
FIG. 2 is a plan view of the wheel loader shown in FIG. 1.
Figure 10:
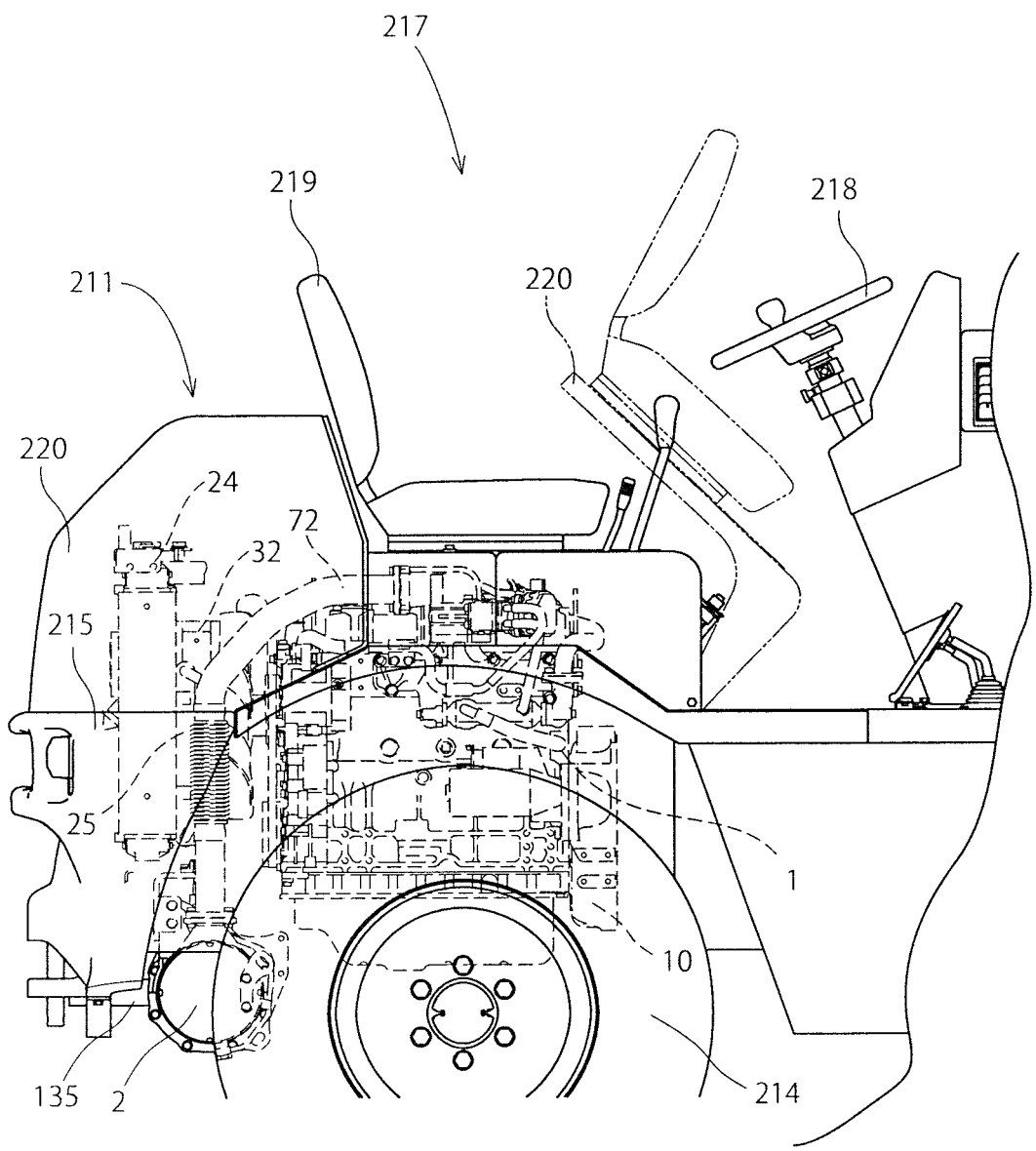
FIG. 10 is a right side enlarged view of the wheel loader shown in FIG. 1.

A wheel loader 211 shown in FIGS. 1, 2, and 10 includes a traveling machine body 216 equipped with left and right pairs of front wheels 213 and rear wheels 214. An operation portion 217 and an engine 1 are mounted in the traveling machine body 216. A loader device 212 as a work unit is attached to a front part of the traveling machine body 216 so that a loading work can be performed. In the operation portion 217, there are arranged an operator's seat 219 on which an operator sits, an steering wheel 218, operation means for operating an output of the engine 1 and the like, and a lever, a switch, or the like as operation means for the loader device 212.

In a front part of the wheel loader 211 above the front wheels 213, the loader device 212 as a work unit is disposed as described above. The loader device 212 includes loader posts 222 disposed on the left and right sides of the traveling machine body 216, a pair of left and right lift arms 223 connected to the upper ends of the loader posts 222 in as vertically swingable manner, and a bucket 224 connected to the distal ends of the left and right lift arms 223 in a vertically swingable manner.

Lift cylinders 226 for vertically swinging the lift arms 223 are respectively disposed between each of the loader posts 222 and the corresponding lift arm 223. A bucket cylinder 228 for vertically swinging the bucket 224 is disposed between the bucket 224 and the left and right lift arms 223. In this case, the operator on the operator's seat 219 operates a loader lever (not shown) so that the lift cylinder 226 and the bucket cylinder 228 are expanded or contracted, and hence the lift arm 223 and the bucket 224 are vertically swing for performing the loading work.

In this wheel loader 211, the engine 1 is disposed under the operator's seat 219 in such a manner that a flywheel housing 10 is positioned on a front part side of the traveling machine body 216. In other words, the engine 1 is disposed so that direction of the engine output shall be along the front and rear direction in which the loader device 212 and a counterweight 215 are aligned. In addition, a continuous regeneration type exhaust gas purification device 2 (diesel particulate filter) is disposed under a radiator 24 behind the engine 1. In other words, the exhaust gas purification device 2 is disposed away from the engine 1 under between the counterweight 215 and the engine 1. In this way, the exhaust gas purification device 2 as a heavy object functions as an assist to the counterweight 215.

Further, the engine 1 is connected to an air cleaner 32 for taking in fresh air (external air) at the left side thereof and is connected to an exhaust pipe (exhaust gas communication pipe) 72 at the right side thereof, which is connected to an air inlet side of the exhaust gas purification device 2. In other words, because the air cleaner 32 and the exhaust pipe 72 are disposed so as to sandwich the engine 1, the air cleaner 32 and the exhaust pipe 72 are disposed at positions away from each other. Accordingly, it is possible to suppress an influence of dissipated heat of the exhaust gas passing through the exhaust pipe 72 such as deformation of the air cleaner 32 made of a resin molded article or the like to be vulnerable to heat.

In this way, the engine 1, the exhaust gas purification device 2, the radiator 24, and the air cleaner 32 disposed behind and under the operator's seat 219 are covered with a bonnet 220 disposed above the counterweight 215. The bonnet 220 is configured as a sheet frame 221 having a part behind the operation portion 217 configured to be openable and closable and a part inside the operation portion 217 configured to protrude from the floor of the operation portion 217.

The operator's seat 219 is disposed on the upper side of the sheet frame 221 of the bonnet 220 in an attachable and detachable manner. In this way, when the operator's seat 219 is removed from the sheet frame 221, the upper surface of the sheet frame 221 is opened so that maintenance of the engine 1 or the like under the sheet frame 221 can be performed. Note that the structure in which the operator's seat 219 is attachable and detachable is not a limitation. It is possible to configure the operator's seat 219 to be tilted forward above the sheet frame 221 so that the upper surface of the sheet frame 221 is opened, in this case, as an example shown in FIG. 10, it is possible to configure the sheet frame 221 itself, to which the operator's seat 219 is fixed, to be tilted forward so that the upper side of the engine 1 and the like is opened.

As to the engine 1, a mission case 132 is connected to the front side of the flywheel housing 10. The power from the engine 1 via a flywheel 11 is appropriately gear-shifted in the mission case 132 and is transmitted to the front wheels 213 and the rear wheels 214 as well as a hydraulic driving source 133 such as the lift cylinder 226 and the bucket cylinder 228.

Next, with reference to FIGS. 3 to 8, the engine device of the present invention is described below using an example of the diesel engine 1 mounted as a prime mover in a work machine such as the wheel loader 211 described above. As described above, the diesel engine 1 is equipped with the exhaust gas purification device 2 that is connected via the exhaust pipe 72. The exhaust gas purification device 2, has a function of removing particulate matter (PM) in the exhaust gas from the diesel engine 1 as well as a function of reducing carbon monoxide (CO) and hydrocarbon (HC) in the exhaust gas from the diesel engine 1.

The diesel engine 1 includes a cylinder block 4 including an engine output crank shaft 3 and a piston (not shown). A cylinder head 5 is placed on the cylinder block 4. An intake manifold 6 is disposed on the left side of the cylinder bead 5. An exhaust manifold 7 is disposed on the right side of the cylinder head 5. A head cover 8 is disposed on the upper side of the cylinder head 5. A cooling fan 9 is disposed on the rear side of the cylinder block 4. The flywheel housing 10 is disposed on the front side of the cylinder block 4. The flywheel 11 is disposed in the flywheel housing 10.

The flywheel 11 is pivoted to the crank shaft 3 (engine output shaft). Power of the diesel engine 1 is extracted to a working part of a work vehicle (such as a backhoe or a forklift) via the crank shaft 3. Further, an oil pan 12 is disposed on the lower side of the cylinder block 4. Lubricating oil in the oil pan 12 is supplied to lubricating parts of the diesel engine 1 via an oil filter 13 disposed on a side surface of the cylinder block 4.

A fuel supply pump 14 is attached to a part above the oil filter 13 (below the intake manifold 6) in side surfaces of the cylinder block 4. Injectors 15 with electromagnetic switch control type fuel injection valves (not shown) for four cylinders are provided to the diesel engine 1. Each of the injectors 15 is connected to a fuel tank (not shown) mounted in the work vehicle via the fuel supply pump 14, a cylindrical common rail 16, and a fuel filter (not shown).

Fuel in the fuel tank is sent by pressure from the fuel supply pump 14 to the common rail 16 so that high pressure fuel is stored in the common rail 16. By controlling on and off of the fuel injection valve of each injector 15, the high pressure fuel in the common rail 16 is injected from each injector 15 into each cylinder of the diesel engine 1.

A cooling water pump 21 for circulating cooling water is disposed slightly left on the front of the cylinder block 4 in a coaxial manner with a fan shaft of the cooling fan 9. When the crank shaft 3 rotates, the cooling fan 9 and the cooling water pump 21 are driven via a cooling fan driving V-belt 22. The cooling water in the radiator 24 mounted in the work vehicle is supplied to the cooling water pump 21 when the cooling water pump 21 is driven. Further, the cooling water is supplied to the cylinder block 4 and the cylinder head 5 so that the diesel engine 1 is cooled. Further, an alternator 23 is disposed on the left side of the cooling water pump 21.

Engine leg attaching parts 19 are respectively disposed on the left and right sides of the cylinder block 4. An engine leg body 34, which includes an anti-vibration rubber 35 and is connected to the left or right side wall of the machine body frame 94, is fastened with bolt to each of the engine leg attaching parts 19. The diesel engine 1 is supported with vibration isolation via the engine lea body 34 by the machine body frame 94 of the traveling machine body 216 of the work vehicle such as the Wheel loader 211 described above. In this way, it is possible to prevent vibration of the diesel engine 1 from propagating to the machine body frame 94.

Further, an EGR device 26 (exhaust gas recirculation device) is described. The air cleaner 32 is connected to an inlet part of the intake manifold 6 protruding upward via the EGR device 26 (exhaust gas recirculation device). The fresh air (external air) is sent from the air cleaner 32 to the intake manifold 6 via the EGR device 26.

The EGR device 26 includes an EGR main body case 27 (collector) that mixes a part of the exhaust gas from the diesel engine (EGR gas from the exhaust manifold) with the fresh air (external air from an air cleaner 80) so as to supply the mixture to the intake manifold 6, an air intake throttle member 28 that permits the air cleaner 32 to communicate to the EGR main body case 27 via an air intake tube 33, a recirculating exhaust gas tube 30 as a recirculation conduit connected to the exhaust manifold 7 via an EGR cooler 29, and an EGR valve member 31 that permits the recirculating exhaust gas tube 30 to communicate to the EGR main body case 27.

In other words, the intake manifold 6 and the air intake throttle member 28 for taking in fresh air are connected to each other via the EGR main body case 27. Further, the EGR main body case 27 is communicated to an outlet side of the recirculating exhaust gas tube 30 extending from the exhaust manifold 7. The EGR main body case 27 is formed in a long cylindrical shape. The air intake throttle member 28 is fastened with bolt to one end portion in a longitudinal direction of the EGR main body case 27. A downward open end portion of the EGR main body case 27 is fastened with bolt to the inlet part of the intake manifold 6 in an attachable and detachable manner.

In addition, the outlet side of the recirculating exhaust gas tube 30 is connected to the EGR main body case 27 via the EGR valve member 31. An inlet side of the recirculating exhaust gas tube 30 is connected to the lower side of the exhaust manifold 7 via the EGR cooler 29. An opening degree of the EGR valve (not shown) in the EGR valve member 31 is adjusted so as to adjust a supply amount of the EGR gas to the EGR main body case 27.

With the structure described above, fresh air (external air) is supplied from the air cleaner 80 into the EGR main body case 27 via the air intake throttle member 28, while the EGR gas (a part of the exhaust gas discharged from the exhaust manifold) is supplied from the exhaust manifold 7 into the EGR main body case 27 via the EGR valve member 31. The fresh air from the air cleaner 80 and the EGR gas from the exhaust manifold 7 are mixed in the EGR main body case 27, and then the mixture gas in the EGR main body case 27 is supplied to the intake manifold 6. In other words, a part of the exhaust gas discharged from the diesel engine 1 to the exhaust manifold 7 is recycled from the intake manifold 6 to the diesel engine 1 so that the maximum combustion temperature in a high load operation is decreased, and hence a discharge amount of NOx (nitrogen oxide) from the diesel engine 1 is reduced.

The radiator 24 is disposed behind the diesel engine 1 at a position facing the cooling fan 9, via a fan shroud (not shown). This radiator 24 has an upper side connected to the left and right side wall portions of the machine body frame 94 via an upper support bracket 57 with an anti-vibration rubber 59 so that the radiator 24 is supported in an anti-vibration manner. In other words, the upper support bracket 57 is fastened with bolt to support members 95 and 96 fixed to the left and right side wall portions of the machine body frame 94, and is fixed so as to bridge upper sides of the left and right side wall portions of the machine body frame 94. The radiator 24 has an upper side connected to the upper support bracket 57 so that the radiator 24 is supported in an anti-vibration manner via the anti-vibration rubber 59. In addition, an oil cooler 25 is disposed on the front side of the radiator 24 so as to face the cooling fan 9.

In this way, the radiator 24 and the oil cooler 25 are aligned toward the discharge direction of the cooling air in an ascending order of the heat release amount in a position facing the cooling fan 9 behind the diesel engine 1. Accordingly, when the cooling fan 9 is driven to rotate, external air is taken in from behind the diesel engine 1 so that the radiator 24 and the oil cooler 25 as heat exchangers are blown by the external air (cooling air) and are cooled by the air.

The air cleaner 32 has one end connected to the other end side of the air intake tube 33 connected to an air intake port of the air intake throttle member 28. Because the air intake tube 33 is extended toward the rear side of the diesel engine 1, the air cleaner 32 is disposed behind the diesel engine 1 on the left side. In other words, the air cleaner 32 is disposed on the left side of the radiator 24 disposed behind the diesel engine 1.

Next, with reference to FIGS. 3 to 9, the exhaust gas purification device 2 is described. The exhaust gas purification device 2 includes an exhaust gas purification case 38 having a purification inlet tube 36 and a purification outlet tube 37. Inside the exhaust gas purification case 38, a diesel oxidation catalyst 39 (gas purification body) such as platinum for generating nitric dioxide (NO2) and a soot filter 40 (gas purification body) having a honeycomb structure for continuously oxidizing and removing collected particulate matter (PM) at relatively low temperature are arranged in series in the moving direction of the exhaust gas (from lower to upper in FIG. 1). Note that one side part of the exhaust gas purification case 38 is formed of a silencer 41, and the purification outlet tube 37 connected to a tail pipe 135 is provided to the silencer 41.

With the structure described above, the nitric dioxide (NO2) generated by oxidation reaction of the diesel oxidation catalyst 39 is supplied, into the soot filter 40 from one side end surface (inlet side end surface). The particulate matter (PM) contained in the exhaust gas from the diesel engine 1 is collected by the soot filter 40 and is continuously oxidized and removed by the nitric dioxide (NO2). In addition to the removal of the particulate matter (PM) in the exhaust gas from the diesel engine 1, contents of carbon monoxide (CO) and hydrocarbon (HC) in the exhaust gas from the diesel engine 1 are also reduced.

In addition, an upstream side gas temperature sensor 42 and a downstream side gas temperature sensor 43 of a thermistor type are attached to the exhaust gas purification case 38. Exhaust gas temperature on the gas inlet side end surface of the diesel oxidation catalyst 39 is detected by the upstream side gas temperature sensor 42. Exhaust gas temperature on the gas outlet side end surface of the diesel oxidation catalyst is detected by the downstream side gas temperature sensor 43.

Further, a differential pressure sensor 44 as an exhaust gas pressure sensor is attached to the exhaust gas purification case 38. An exhaust gas pressure difference between the upstream side and the downstream side of the soot filter 40 is detected by the differential pressure sensor 44. On the basis of the exhaust gas pressure difference between the upstream side and the downstream side of the soot filter 40, amount of deposition of the particulate matter in the soot filter 40 is calculated, so that a dogged state of the soot filter 40 can be grasped.

The differential pressure sensor 44 provided integrally with an electric wiring connector is attached to a sensor placing table (sensor support portion) 98 disposed on the upper side of a support frame 97. The differential pressure sensor 44 is disposed on the outer side surface of the exhaust gas purification case 38. One can sides of an upstream side sensor conduit 47 and a downstream side sensor conduit 48 are connected to the differential pressure sensor 44. Sensor conduit bosses 49 and 50 on the upstream side and the downstream side are disposed on the exhaust gas purification case 38 so as to sandwich the soot filter 40 in the exhaust gas purification case 38. The sensor conduit bosses 49 and 50 are respectively connected to the other end sides of the upstream side sensor conduit 47 and the downstream side sensor conduit 48.

With the structure described above, a difference between inlet side exhaust gas pressure of the soot filter 40 and outlet side exhaust gas pressure of the soot filter 40 (exhaust gas pressure difference) is detected by the differential pressure sensor 44. A remaining amount of the particulate matter in the exhaust gas collected by the soot filter 40 is proportional to the exhaust gas pressure difference. Accordingly, when an amount of the particulate matter remaining in the soot filter 40 is increased to a predetermined amount or more, regeneration control for reducing the amount of the particulate matter in the soot filter 40 (such as control of increasing exhaust gas temperature) is performed on the basis of the detection result by the differential pressure sensor 44. In addition, when the remaining amount of the particulate matter is further increased beyond the range in which the regeneration control can be performed, a maintenance work is performed in which the exhaust gas purification case 38 is detached and disassembled, and the soot filter 40 is cleaned so that the particulate matter is manually removed.

Further, an electric wiring connector 51 is integrally attached to an outer case portion of the differential pressure sensor 44, while an electric wiring connector (not shown) of the upstream side gas temperature sensor 42 and an electric wiring connector (not shown) of the downstream side gas temperature sensor 43 are fixed to the sensor placing table 98 of the support frame 97. The sensor placing table 98 is formed by bending a metal plate extending to the upper side of the support frame 97, and the differential pressure sensor 44 and the like are disposed on the upper side of the sensor placing table 98.

Here, the support frame 97 is formed of a metal plate whose left and right ends are bent. The bent parts of the left and right ends of the support frame 97 are used as fastening parts 99 to the left and right side walls of the machine body frame 94. When the fastening parts 99 are fastened with bolt to the left and right side walls of the machine body frame 94, the support frame 97 is fixed to the machine body frame 94 so as to bridge the left and right side walls of the machine body frame 94. The support frame 97 fixed in this way is disposed on the lower side of the oil cooler 25 in such a manner that the plate surface thereof is perpendicular to the left and right side walls of the machine body frame 94.

In addition, a hanging body 55 is formed integrally to an outlet sandwich flange 45 of the exhaust gas purification case 38, while a hanging metal fixture 56 is fastened with bolt to a side face of the exhaust gas purification case 38 with the purification inlet tube 36 on the exhaust gas inlet side. The hanging body 55 and the hanging metal fixture 56 are disposed separately from each other in a diagonal direction of the exhaust gas purification case 38. In an assembly factory of the diesel engine 1 or in other sites, the hanging body 55 and the hanging metal fixture 56 are engaged with a hook of a chain block or the like (not shown), the exhaust gas purification case 38 is suspended and supported by the chain block or the like, and the exhaust gas purification case 38 is assembled to the diesel engine 1. The exhaust gas purification case 38 as a heavy object can be suspended in a stable position by arrangement of the hanging body 55 and the hanging metal fixture 56 in the diagonal direction.

In addition, the exhaust gas purification case 38 includes a connection leg (left bracket) 80 fastened with bolt to the outlet sandwich flange 45 in an attachable and detachable manner and a fixed leg (right bracket) 81 welded to the same.

In this case, an attachment boss of the connection leg 80 is fastened with bolt to a leg fastening part with through holes formed in an arc body of the outlet sandwich flange 45. In addition, the fixed leg 81 is welded to the outer circumference surface of the exhaust gas purification case 38 on the purification inlet tube 36 side.

In other words, the fixed leg 81 is disposed on the inlet side of the exhaust gas purification case 38, while the connection leg 80 is disposed on the outlet side of the exhaust gas purification case 38. Note that the connection leg 80 may be fastened to another sandwich flange such as an intermediate sandwich flange that is fastened when the exhaust gas purification case 38 is assembled, without limiting to the outlet sandwich flange 45.

Each of the connection leg 80 and the fixed leg 81 disposed on the outer periphery of the exhaust gas purification case 38 is fastened with bolt to the support frame 97 fixed to the machine body frame 94. In this way, the exhaust gas purification device 2 is suspended and supported by the machine body frame 94 via the support frame 97. In other words, the exhaust gas purification device 2 is supported by the machine body frame 94 with reduced vibration transmission from the diesel engine 1. Accordingly, because the vibration transmission from the diesel engine 1 to the exhaust gas purification device 2 can be prevented, improvement of durability and longer life of the exhaust gas purification device 2 can be achieved.

In addition, the support frame 97 for supporting the exhaust gas purification device 2 may be configured in a way that a lower support bracket 58 connected to the lower side of the radiator 24 is contacted with the sensor placing table 98 formed on the support frame 97. This lower support bracket 58 includes an anti-vibration rubber 60 similarly to the upper support bracket 57 for fixing the upper part of the radiator 24, and is supported in an anti-vibration manner by support frame 97. In addition, the lower support bracket 58 may be fixed by the support frame 97 as the lower support bracket 58 is used for connecting to the sensor placing table 98. Further, this lower support bracket 58 may be formed integrally to the support frame 97.

The exhaust pipe 72 for connecting the purification inlet tube 36 of the exhaust gas purification device 2 and a relay pipe 66 includes a bellows flexible tube 73 as a part of the exhaust pipe 72. In the structural example shown in FIGS. 3 to 8, the flexible tube 73 is disposed at a position between the position where the exhaust pipe 72 is bent downward behind the diesel engine 1 and a position connecting to the purification inlet tube 36. Because the flexible tube 73 is provided to the exhaust pipe 72, in the exhaust pipe 72 to be a connection path to the diesel engine 1, a load due to vibration of the diesel engine 1 can be absorbed by the flexible tube 72. Accordingly, it is possible not only to prevent damage to the exhaust pipe 72 but also to protect the exhaust gas purification device 2 from vibration of the diesel engine 1.

Figure 3:
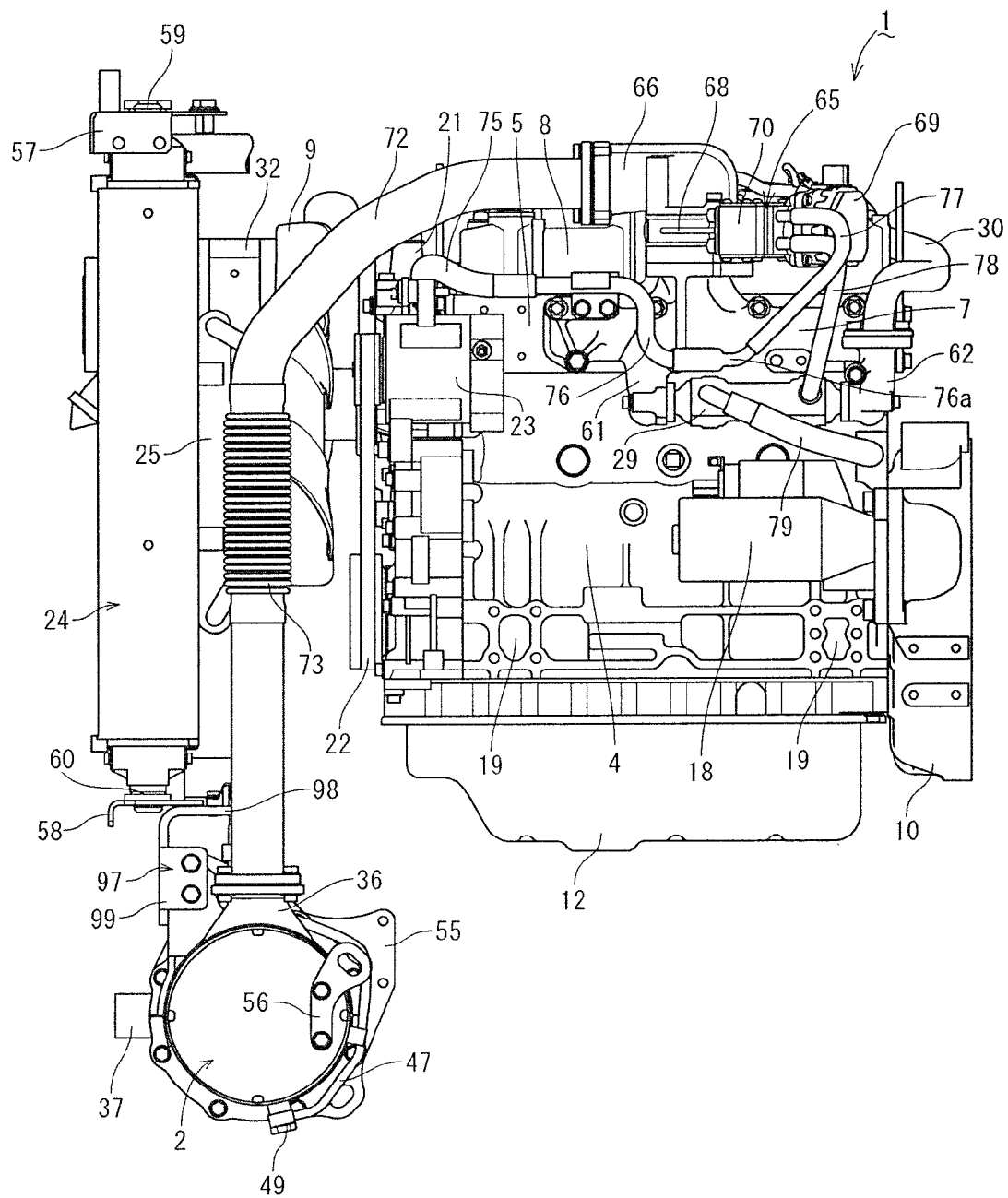
FIG. 3 is a left side view of a diesel engine in the embodiment of the present invention.
Figure 4:
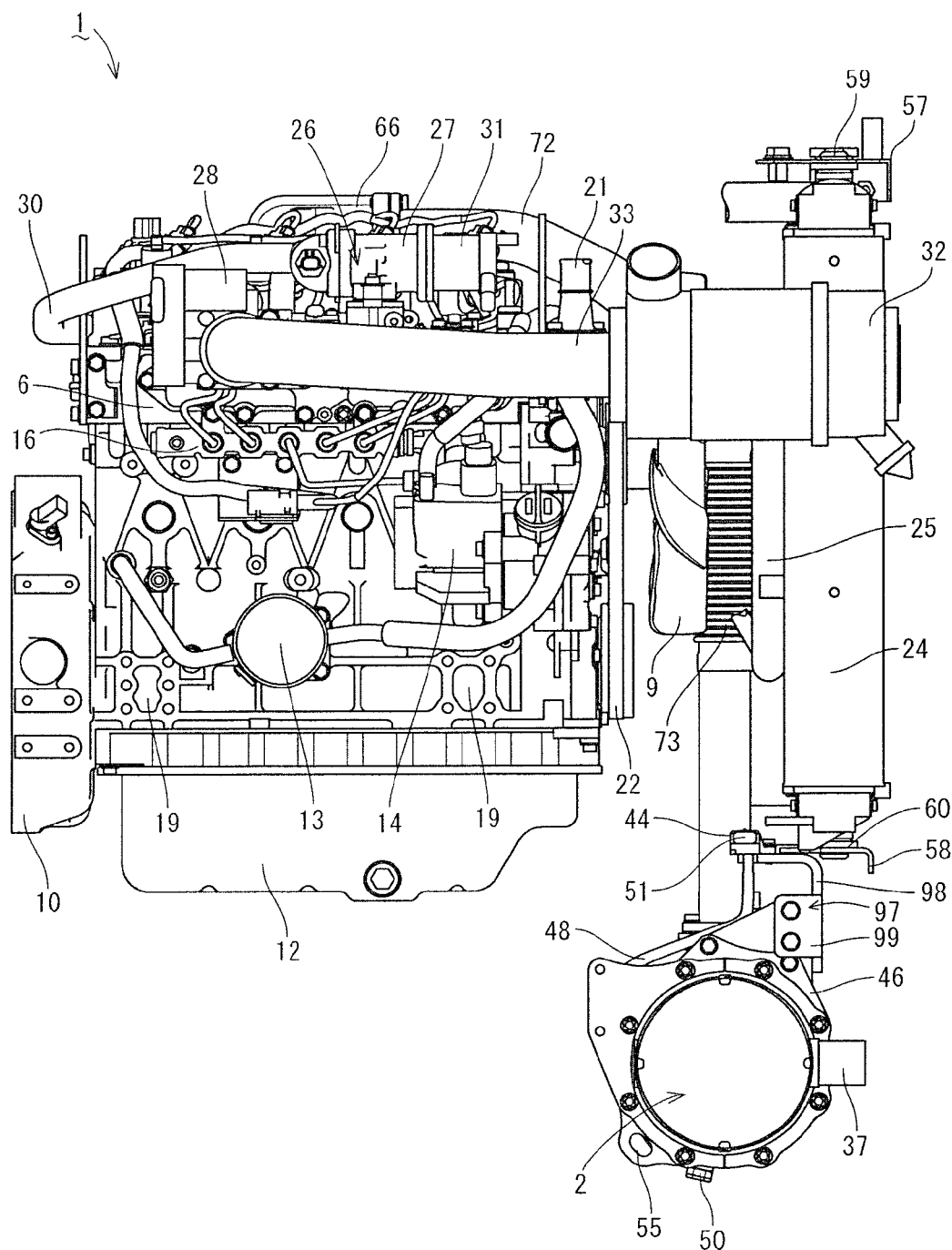
FIG. 4 is a right side view of the diesel engine.
Figure 5:
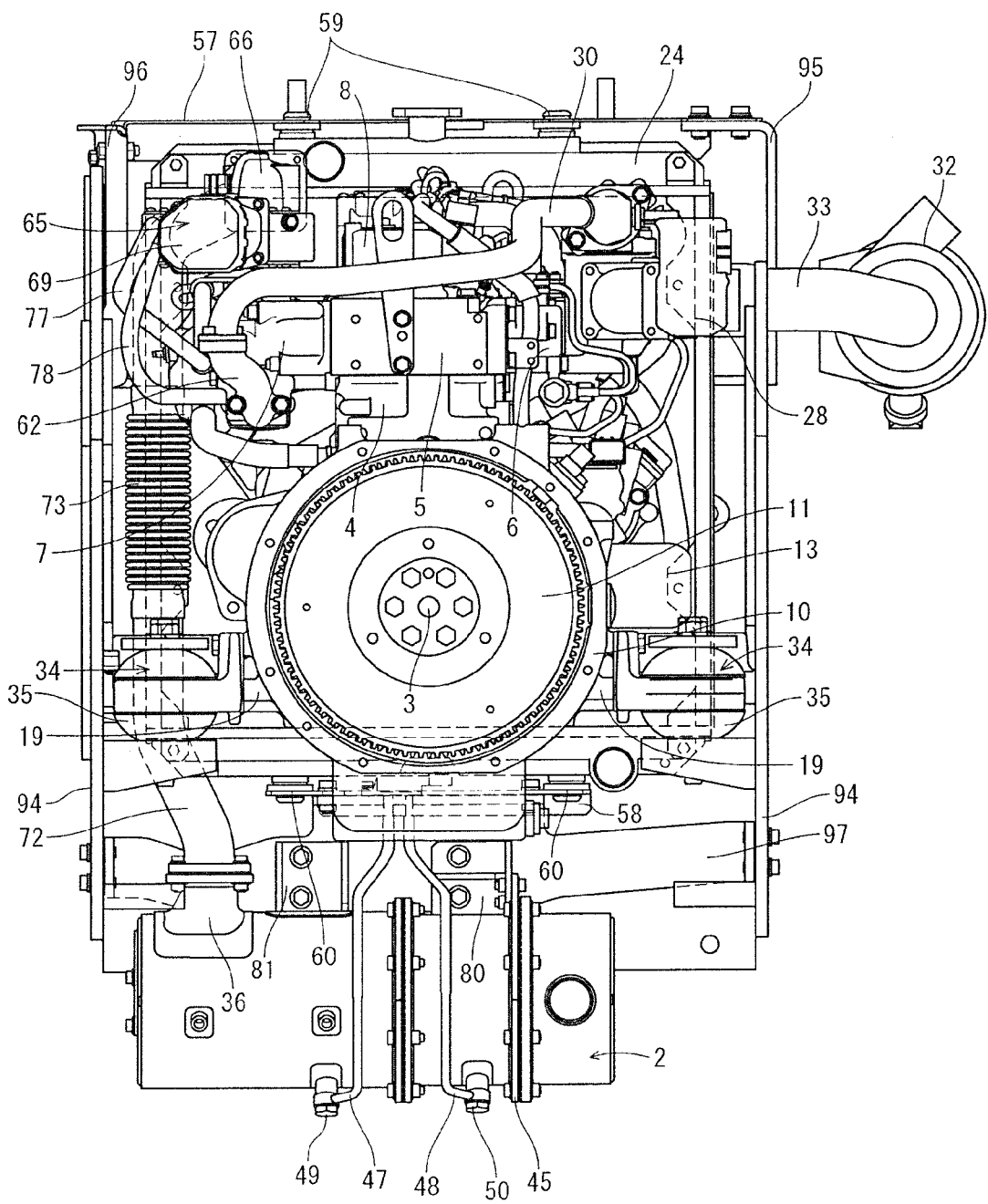
FIG. 5 is a front view of the diesel engine.

Next, as shown in FIG. 3, an EGR gas outlet pipe 61 is formed integrally to the exhaust manifold 7. In addition, a pipe joint member 62 is fastened with bolt to the exhaust manifold 7. An EGR gas inlet part of the EGR cooler 29 is supported by the EGR gas outlet pipe 61 while an EGR gas outlet part of the EGR cooler 29 is supported by the pipe joint member 62 for connecting the recirculating exhaust gas tube 30, and hence the EGR cooler 29 can be disposed apart from the cylinder block 4 (specifically, the left side).

Figure 6:
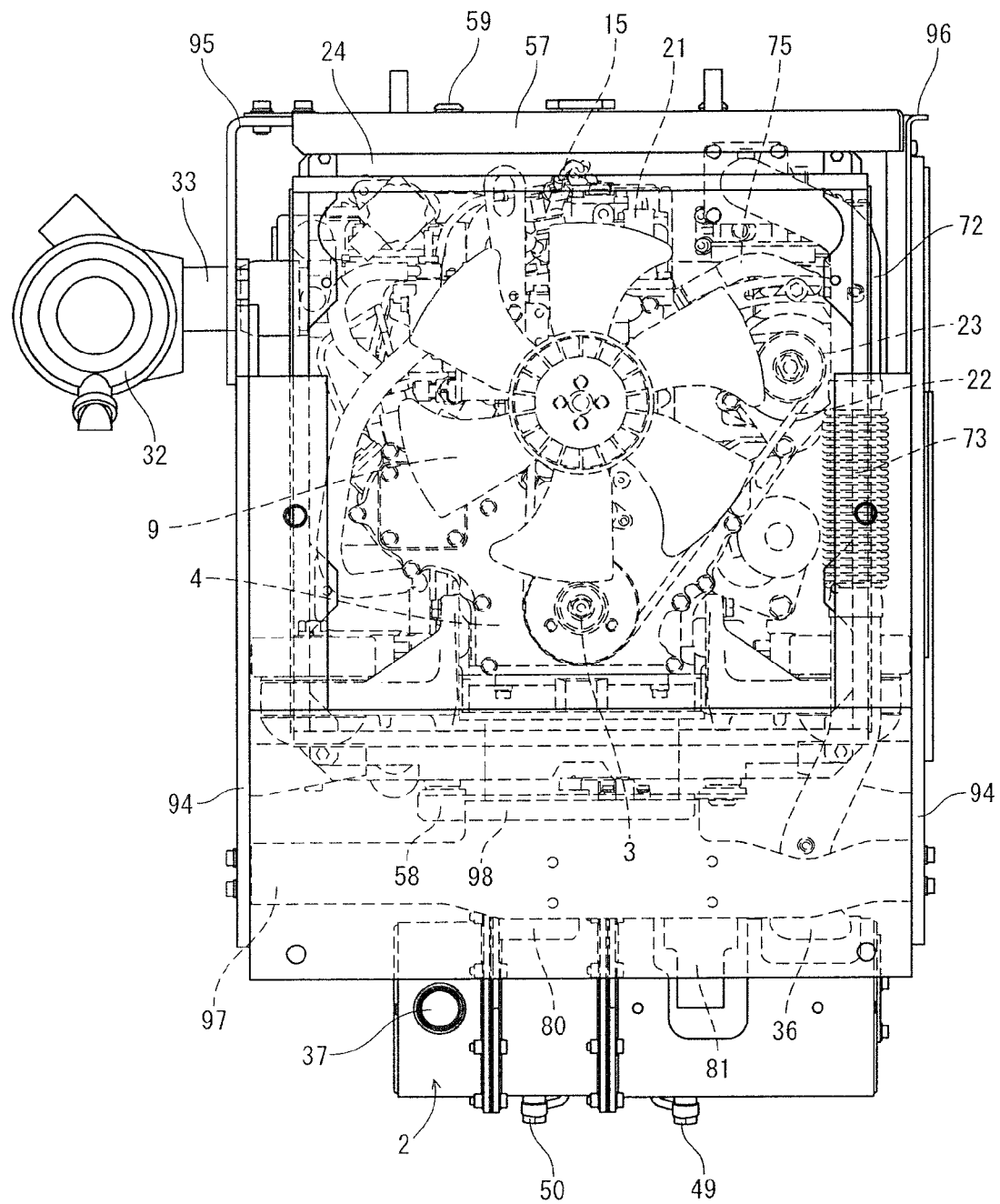
FIG. 6 is a rear view of the diesel engine.
Figure 7:
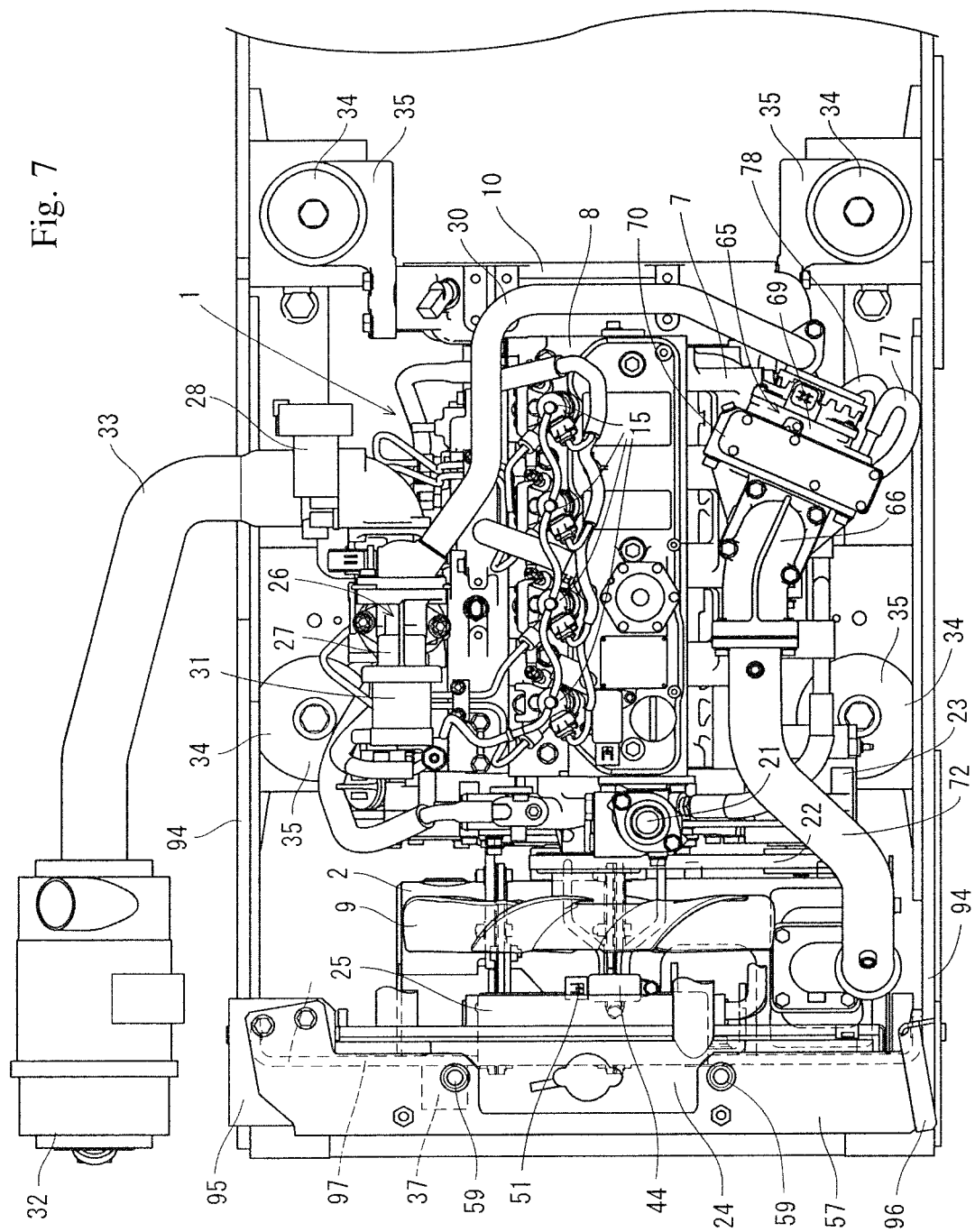
FIG. 7 is a plan view of the diesel engine.
Figure 8:
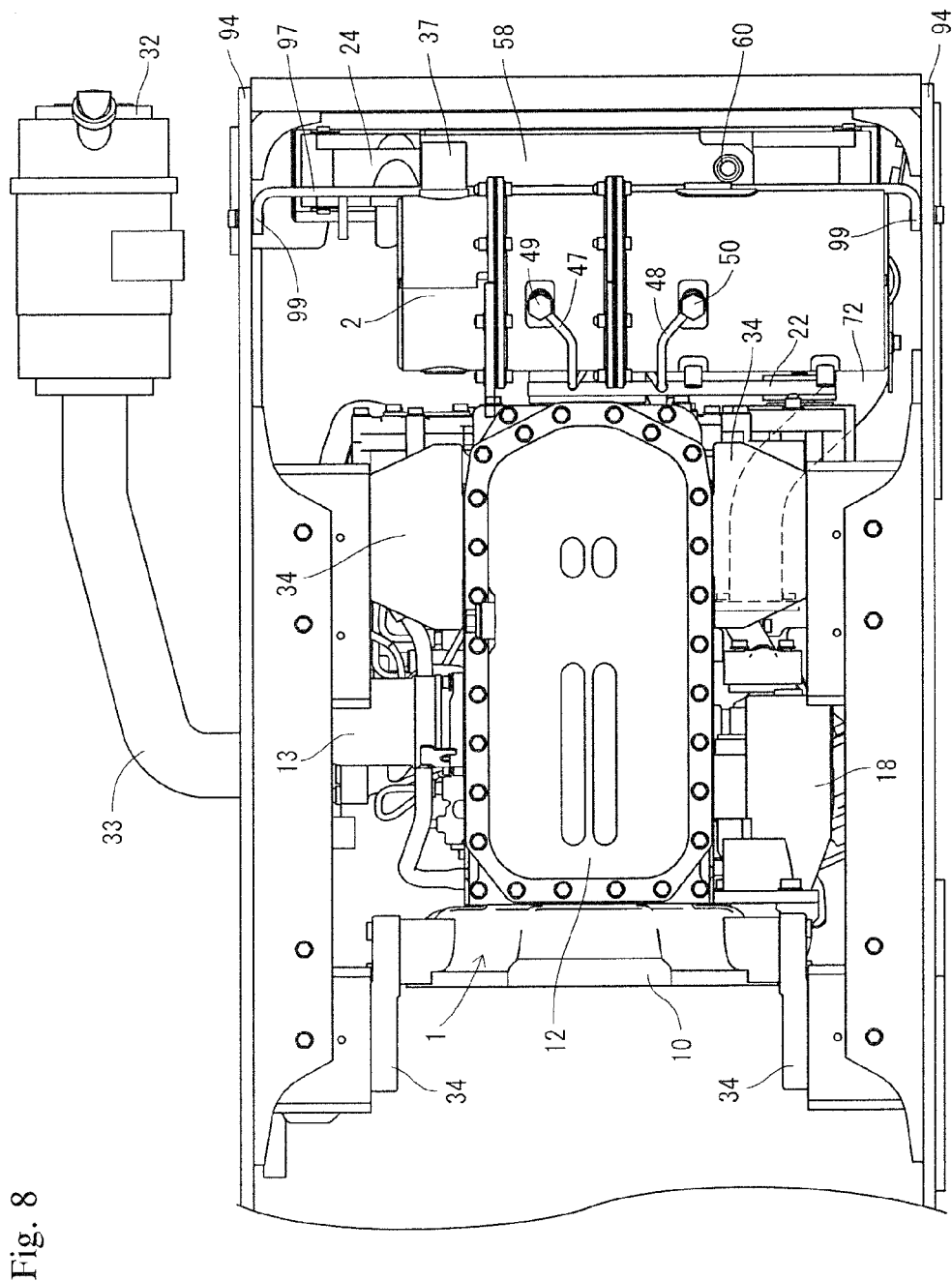
FIG. 8 is a bottom view of the diesel engine.
Figure 9:
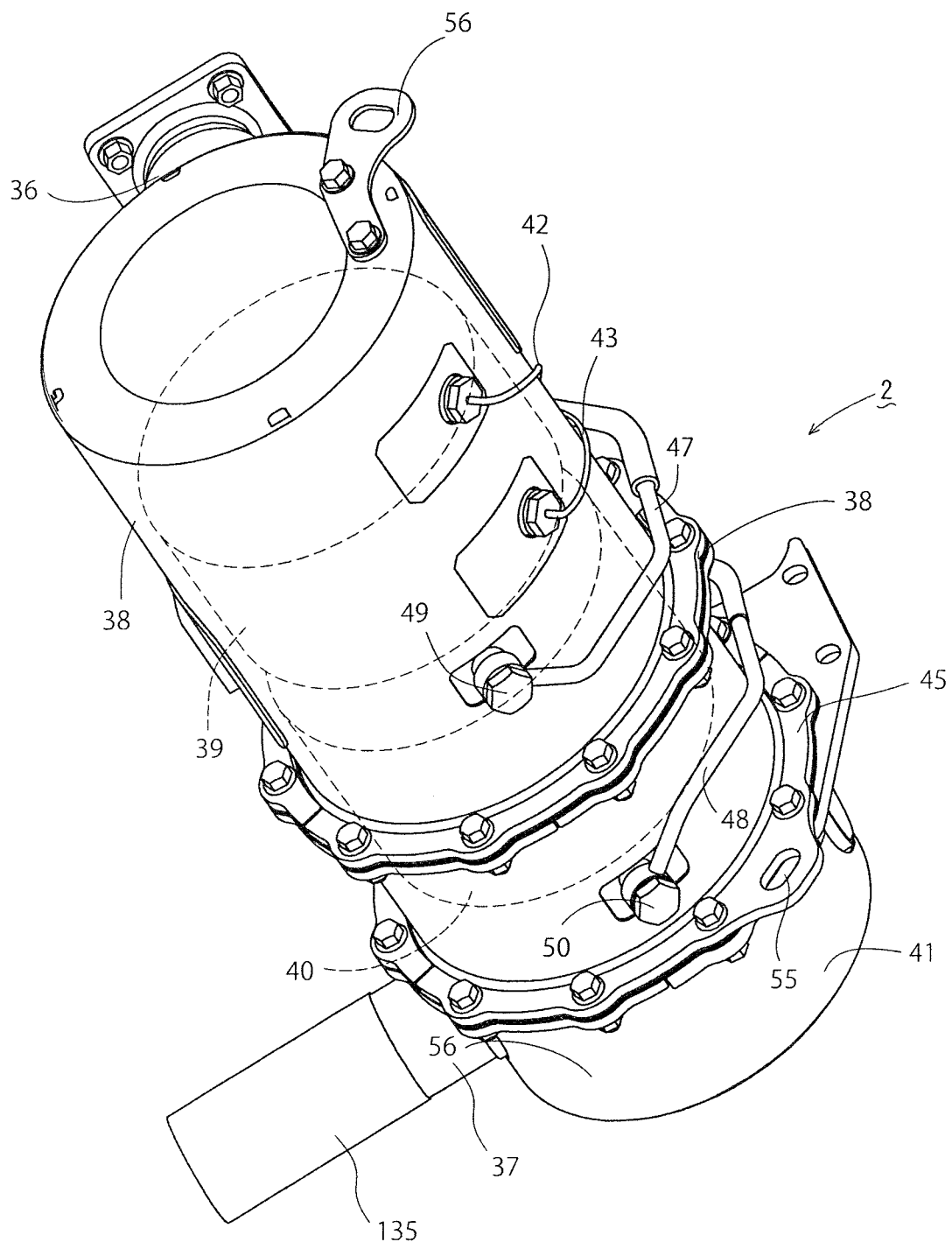
FIG. 9 is an external perspective view of an exhaust gas purification device.

On the other hand, as shown in FIGS. 3, 6, and 7, there is disposed an exhaust gas throttle device 65 for increasing exhaust gas pressure of the diesel engine 1. An exhaust gas outlet of the exhaust manifold 7 opens upward. The exhaust gas outlet of the exhaust manifold 7 is connected in an attachable and detachable manner to the elbow-shaped relay pipe 66 via the exhaust gas throttle device 65 for adjusting the exhaust gas pressure of the diesel engine 1. The exhaust gas throttle device 65 includes a throttle valve case 68 including exhaust gas 3, an actuator case 69 including a mechanism for transmitting power from a motor (actuator) for open control of the exhaust gas throttle valve, and a water cooling case 70 connecting the actuator case 69 to the throttle valve case 68. The power transmission mechanism described above enables a rotation shaft of the motor to work together with a rotation shaft of the exhaust gas throttle valve in the throttle valve case 68 via a gear and the like.

The throttle valve case 68 is placed on the exhaust gas outlet of the exhaust manifold 7, the relay pipe 66 is placed on the throttle valve case 68, and the relay pipe 66 is fastened with four bolts to an exhaust gas outlet body of the exhaust manifold 7 via the throttle valve case 68. The lower side of the throttle valve case 68 is fixed to the exhaust gas outlet body of the exhaust manifold 7. A lower side opening part of the relay pipe 66 is fixed to an upper surface side of the throttle valve case 68. A lateral opening part of the relay pipe 66 is connected to the purification inlet tube 36 via the exhaust pipe 72. Accordingly, the exhaust manifold 7 is connected to the exhaust gas purification device 2 via the relay pipe 66 and the exhaust gas throttle device 65. The exhaust gas that has flowed from the outlet part of the exhaust manifold 7 into the exhaust gas purification device 2 via the purification inlet tube 36 is purified by the exhaust gas purification device 2, then flows from the purification outlet tube 37 to the tail pipe 135, and is finally discharged from the machine.

With the structure described above, the motor of the exhaust gas throttle device 65 is operated on the basis of the pressure difference detected by the differential pressure sensor 44, and hence the regeneration control of the soot filter 40 is performed. In other words, when soot is deposited in the soot filter 40, the exhaust gas pressure of the diesel engine 1 is increased by the control of closing the exhaust gas throttle valve of the exhaust gas throttle device 65. In this way, temperature of the exhaust gas discharged from the diesel engine 1 is increased to a high temperature so that the soot deposited in the soot filter 40 is burned. As a result, the soot is removed so that the soot filter 40 is regenerated.

In addition, even if a work with a small load in which the exhaust gas temperature is apt to be lower (i.e., a work in which soot is apt to deposit) is continuously performed, the soot filter 40 can be regenerated by using the exhaust gas throttle device 65 as exhaust gas temperature increasing mechanism so that the exhaust gas pressure is forced to increase. Thus, exhaust gas purifying ability of the exhaust gas purification device 2 can be appropriately maintained. In addition, it is needless to use a burner or the like for burning the soot deposited in the soot filter 40. Further, as the exhaust gas temperature increasing mechanism for maintaining the exhaust gas purifying ability of the exhaust gas purification device 2, it is possible to dispose a heater for increasing temperature of the exhaust gas. In addition, also when the engine 1 is started, the exhaust gas pressure of the diesel engine 1 is increased by control of the exhaust gas throttle device 65. Thus, the temperature of the exhaust gas from the diesel engine 1 is increased to a high temperature so that warming up of the diesel engine 1 can be promoted.

As described above, because the exhaust gas throttle device 65 fastens the exhaust gas inlet side of the throttle valve case 68 to the exhaust gas outlet of the exhaust manifold 7 opening upward, the exhaust pipe 72 is connected to the exhaust manifold 7 via the throttle valve case 68. Accordingly, the exhaust gas throttle device 65 can be supported by the exhaust manifold 7 having high rigidity. Although the support structure of the exhaust gas throttle device 65 can be configured to have high rigidity, compared with a structure in which the throttle valve case 68 is connected to the exhaust manifold 7 via the relay pipe 66, for example, a volume of the exhaust gas inlet side of the exhaust gas throttle device 65 can be reduced so that the exhaust gas pressure in the exhaust manifold 7 can be adjusted with high accuracy. For instance, temperature of the exhaust gas supplied to the exhaust gas purification device 2 or the like can be easily maintained at a temperature suitable for purifying the exhaust gas.

In addition, the throttle valve case 68 is fastened to the upper surface side of the exhaust manifold 7, the elbow-shaped relay pipe 66 is fastened to the upper surface side of the throttle valve case 68, the throttle valve case 68 and the relay pipe 66 are disposed in a multi-layered manner with respect to the exhaust manifold 7, and the exhaust pipe 72 is connected to the relay pipe 66 as the uppermost layer. Accordingly, without changing a support position of the exhaust gas throttle device 65 or changing specification of the relay pipe 66, it is possible to change an attachment position of the relay pipe 66 (direction of connecting the exhaust pipe 72) in accordance with an attachment position of the exhaust gas purification device 2, for example.

In addition, the exhaust gas outlet of the exhaust manifold 7 is opened upward, the throttle valve case 68 is disposed on the upper surface side of the exhaust manifold 7, a throttle valve gas outlet is firmed on the upper surface side of the throttle valve case 68, and the EGR cooler 29 for cooling the EGR gas is disposed under the throttle valve case 68 so as to sandwich the exhaust manifold 7. Accordingly, the exhaust manifold 7, the exhaust gas throttle device 65, and the EGR cooler 29 can be compactly disposed along one side surface of the engine 1, while the exhaust pipe 72 can be disposed to extend laterally or upwardly from the throttle valve gas outlet of the throttle valve case 68 corresponding to a position of the exhaust gas purification device 2, for example. Thus, the exhaust gas purification device 2 can be functionally supported by a member inside or outside an engine room of the work vehicle (by a component other than the diesel engine 1). In addition, utilizing the outer side surface of the exhaust manifold 7, a cooling water conduit connecting to the exhaust gas throttle device 65 and the EGR cooler 29 (a throttle outlet side pipe 77, a throttle inlet side pipe 78, and the like) can be compactly supported.

On the other hand, a cooling water conduit path for connecting the cooling water pump 21 to the EGR cooler 29 and the exhaust gas throttle device 65 (a flexible cooling water return hose 75, an intermediate pipe 76, the throttle outlet side pipe 77, the throttle inlet side pipe 78, a cooling water outlet hose 79, and the like) is disposed on the left side (exhaust manifold 7 side) of the diesel engine 1. The cooling water from the cooling water pump 21 is supplied to a water cooling part of the diesel engine 1, and in addition, a part of the cooling water is supplied to the EGR cooler 29 and the exhaust gas throttle device 65.

One end side of the intermediate pipe 76 made of an alloy is connected to the return hose 75, and one end side of the throttle outlet side pipe 77 made of an alloy is connected to the other end side of the intermediate pipe 76 made of an alloy via a flexible hose 76a. The other end side of the throttle outlet side pipe 77 is connected to the water cooling case 70 of the exhaust gas throttle device 65 via a flexible hose (not shown) or the like, one end side of the throttle inlet side pipe 78 made of an alloy is connected to the water cooling case 70 via a flexible hose (not shown) or the like, and the other end side of the throttle inlet side pipe 78 is connected to a cooling water drain outlet of the EGR cooler 29 via a flexible hose (not shown) or the like. Further, a cooling water inlet of the EGR cooler 29 is connected to the cylinder block 4 via the cooling water outlet hose 79.

In other words, the EGR cooler 29 and the exhaust gas throttle device 65 are connected in series to the cooling water pump 21. Further, the exhaust gas throttle device 65 is disposed between the cooling water pump 21 and the EGR cooler 29 in the cooling water flow path formed of the hoses 75, 76a, and 79, the pipes 76 to 78, and the like. The exhaust gas throttle device 65 is positioned on the upstream side of the EGR cooler 29. A part of the cooling water from the cooling water pump 21 is supplied from the cylinder block 4 to the exhaust gas throttle device 65 via the EGR cooler 29 so as to be circulated.

In this way, the exhaust gas throttle device 65, to which a part of the cooling water is supplied, is supplied with the cooling water from the throttle outlet side pipe 77 and discharges the cooling water to the throttle inlet side pipe 78. Accordingly, a supply position and a drain position of the cooling water to and from the water cooling case 70 are opposite to an intake position and an exhaust position of the exhaust gas flowing in the throttle valve case 68. In other words, because the supply position of the cooling water is higher than the drain position thereof on the water cooling case 70, backflow of the cooling water flowing in the water cooling case 70 can be more securely prevented.

Figure 11:
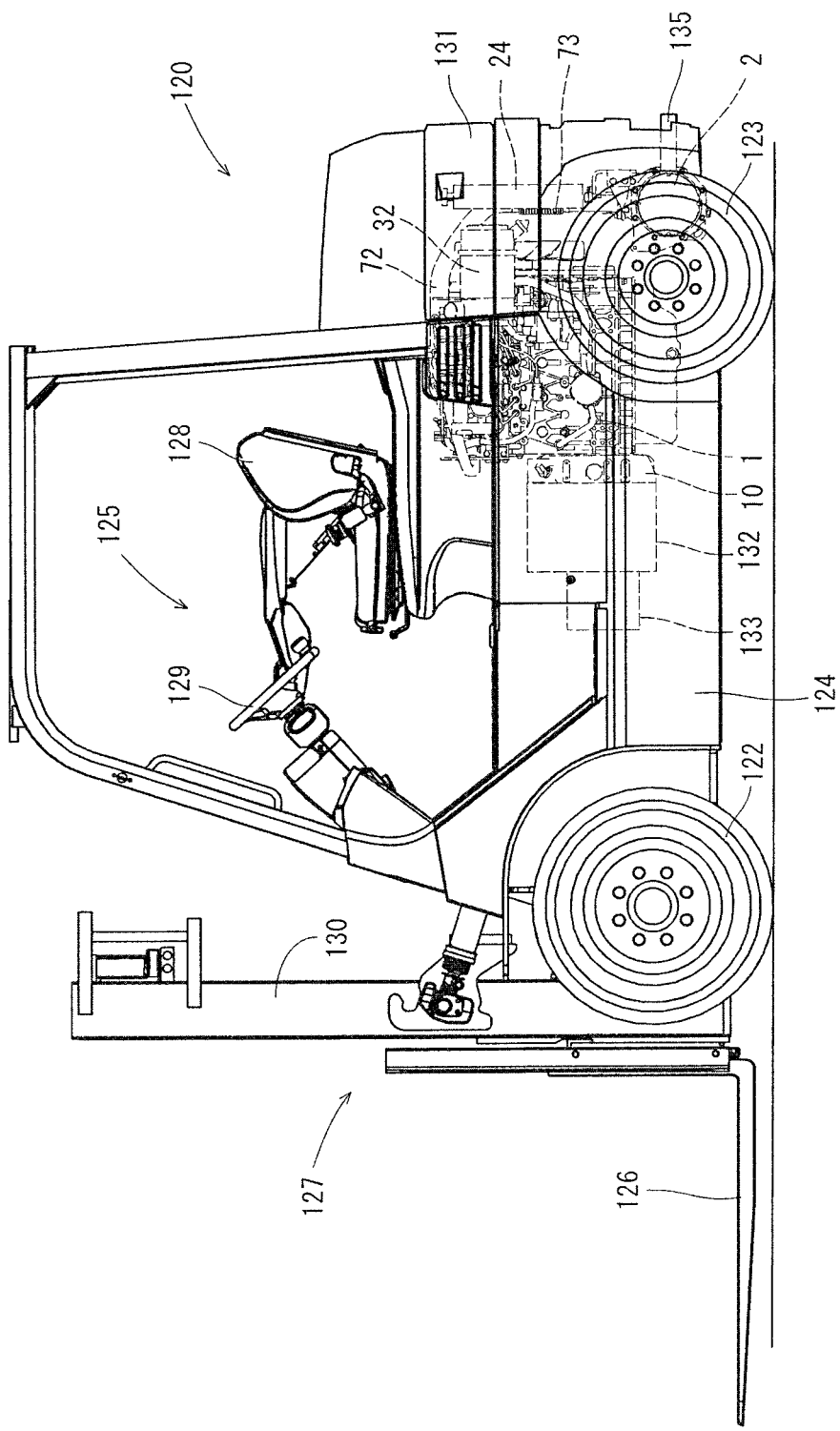
FIG. 11 is a side view of a forklift truck as another example in the embodiment of the work machine of the present invention.
Figure 12:
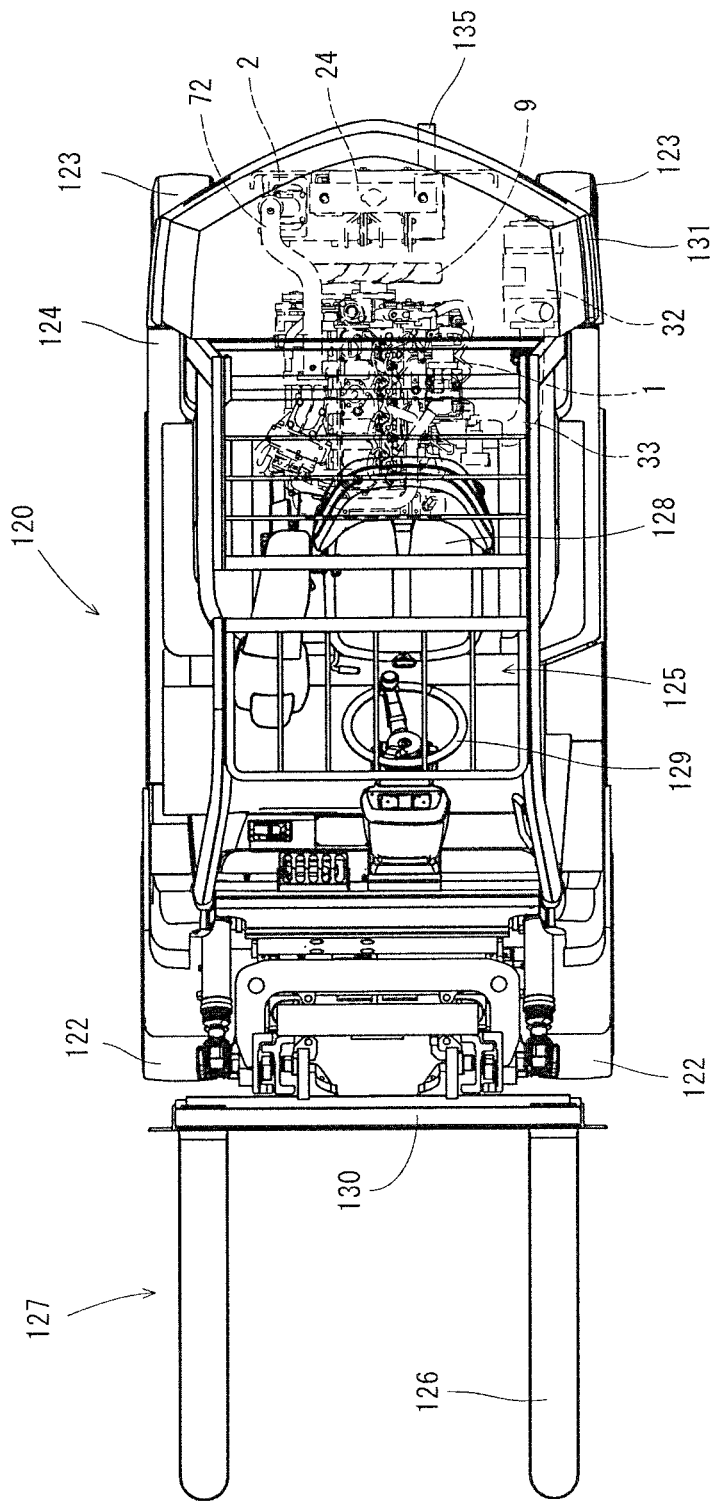
FIG. 12 is a plan view of the forklift truck shown in FIG. 11.

With reference to FIGS. 11 and 12, a structure in which the diesel engine 1 is mounted in a forklift truck 120 is described. As shown in FIGS. 11 and 12, the forklift truck 120 includes a traveling machine body 124 having left and right pairs of front wheels 122 and rear wheels 123. An operation portion 125 and the diesel engine 1 are mounted in the traveling machine body 124. A work unit 127 with a fork 126 for cargo handling work is disposed in a front part of the traveling machine body 124. An operator's seat 128 on which an operator sits, a steering wheel 129, and a lever or a switch as operation means for operating the diesel engine 1 and the like or operation means for the work unit 127, and the like are disposed in the operation portion 125.

The fork 126 is disposed in a manner movable upward and downward along a mast 130 as a component of the work unit 127. The fork 126 is moved upward and downward so that the fork 126 carries a pallet with a cargo (not shown), and the traveling machine body 124 is moved forward and backward so as to perform the cargo handling work such as transport of the pallet.

In this forklift truck 120, the diesel engine 1 is disposed under the operator's seat 128, and the exhaust gas purification device 2 is disposed under and behind the diesel engine 1. Accordingly, the exhaust pipe 72 connecting the diesel engine 1 and the exhaust gas purification device 2 is bent to extend from the lower side of the operator's seat 128 toward a counterweight 131, and the exhaust gas purification device 2 is disposed away from the diesel engine 1.

Further, the radiator 24 is disposed to face the cooling fan 9 behind the diesel engine 1, and the air cleaner 32 is disposed on the left side behind the diesel engine 1. In other words, the air cleaner 32 and the exhaust pipe 72 are disposed on both sides of the diesel engine 1 so as to sandwich the diesel engine 1 and the radiator 24, and the exhaust gas purification device 2 is disposed under the radiator 24.

The diesel engine 1 is disposed so that the flywheel housing 10 is positioned on the front part side of the traveling machine body 124. In other words, the diesel engine 1 is disposed so that the direction of the engine output shaft 74 is along the front and rear direction in which the work unit 127 and the counterweight 131 are aligned. The mission case 132 is connected to the front side of the flywheel housing 10. The power from the diesel engine 1 via the flywheel 11 is appropriately gear-shifted in the mission case 132 and is transmitted to the front wheels 122 and the rear wheels 123 as well as the hydraulic driving source 133 of the fork 126.

As shown in FIGS. 3 to 8, the engine device in the embodiment described above has the structure in which the exhaust gas purification device 2 is connected to the machine body frame 94 via the support frame 97. In this way, the exhaust gas purification device 2 is supported by a construction isolated from vibration of the diesel engine 1. Accordingly, as described above, the flexible tube 73 is provided to the exhaust pipe 72 so as to prevent transmission of vibration of the diesel engine 1 from the exhaust pipe 72 to the exhaust gas purification device 2.

Further, the present invention is not limited to the embodiment described above but can be embodied in various forms. For instance, the engine device according to the present invention can be applied not only to the forklift truck 120 and the wheel loader 211 described above but also to various work machines such as agricultural machines including a harvesting machine and a tractor, and special work vehicles including a crane vehicle. In addition, structures of portions of the present invention are not limited to those in the embodiment shown in the drawings but can be variously modified within the scope of the spirit of the present invention.

Hereinafter, an engine device according to another embodiment of the present invention is described below with reference to FIGS. 13 and 14. Note that in the structure shown in FIGS. 13 and 14, a part used for the same purpose as that in FIGS. 1 to 10 is denoted by the same reference numeral. The engine device of this embodiment is different from the engine device of the embodiment described above (see FIGS. 3 to 8) in that the exhaust gas purification device 2 is fixed to the diesel engine 1. Accordingly, in the following description, the fixing structure of the exhaust gas purification device 2 is described.

Figure 13:
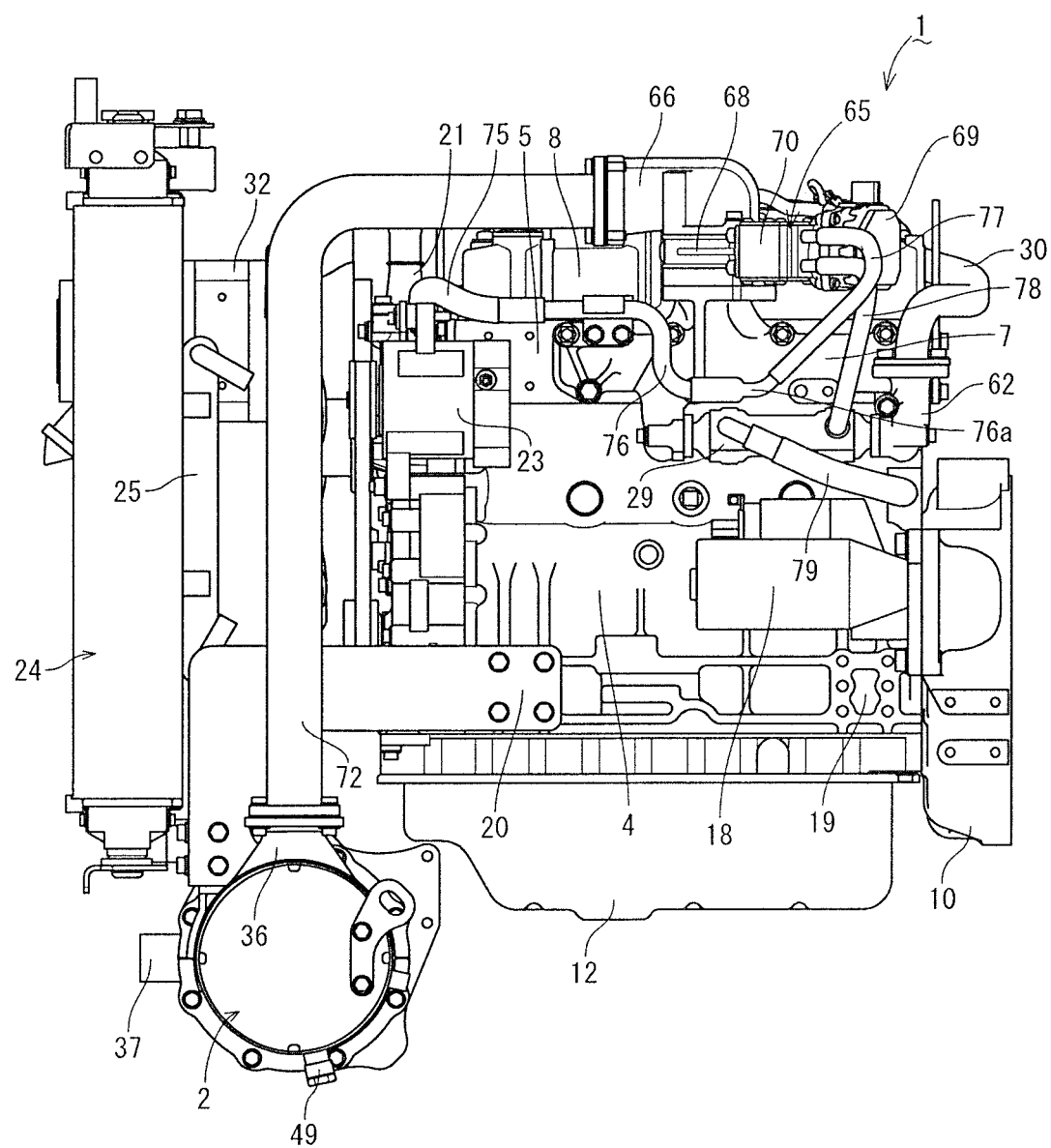
FIG. 13 is a right side view of a diesel engine in another embodiment of the present invention.
Figure 14:
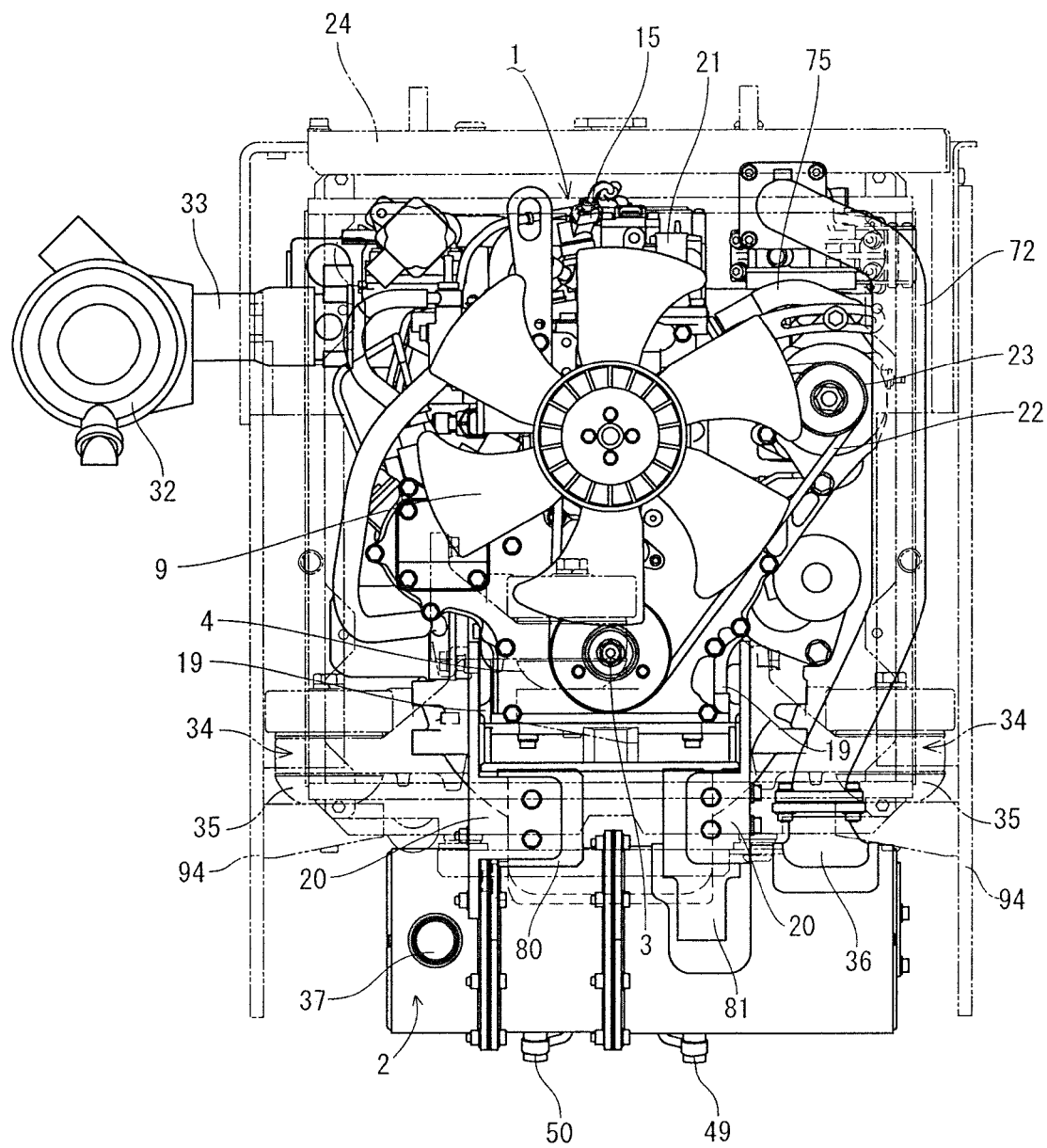
FIG. 14 is a rear view of the diesel engine.

As shown in FIGS. 13 and 14, the exhaust gas purification device 2 is connected to the engine leg attaching parts 19 disposed on the left and right sides of the cylinder block 4 of the diesel engine 1 via support bracket 20. In this case, the left and right support brackets 20 are fastened with bolt to the engine leg attaching parts 19 of the cooling fan 9 side on the left and right sides of the cylinder block 4 together with the engine leg body 34. Further, the left side support bracket 20 is fastened with bolt to the connection leg 80 and the outlet sandwich flange 45, while the right side support bracket 20 is fastened with bolt to the fixed leg 81. In this way, the exhaust gas purification device 2 is supported under and behind the diesel engine 1.

The support structure of the exhaust gas purification device 2 supported as described above is a structure integrated to the diesel engine 1. Accordingly, the exhaust pipe 72 connecting the purification inlet tube 36 of the exhaust gas purification device 2 and the relay pipe 66 of the diesel engine 1 does not need a structure for preventing vibration transmission, so that the flexible tube 73 can be eliminated. In addition, because the exhaust gas purification device 2 can be integrally assembled to the diesel engine 1, it is possible to assemble the exhaust gas purification device 2 to the diesel engine 1 in an engine assembly factory before shipping.

Further, the exhaust gas purification device 2 is supported by the diesel engine 1 using the support bracket 20 as shown in FIGS. 13 and 14 in this embodiment, but this structure is not a limitation. For instance, instead of the support bracket 20, the support bracket connecting the exhaust gas purification device 2 and the diesel engine 1 may be formed as one component having fastening surfaces to the connection leg 80 and the fixed leg 81 of the exhaust gas purification device 2 and fastening surfaces to the engine leg attaching parts 19 on the left and right sides of the diesel engine 1.

EXPLANATION OF NUMERALS

1 diesel engine
2 exhaust gas purification device
7 exhaust manifold
24 radiator
25 oil cooler
32 air cleaner
33 air intake tube
65 exhaust gas throttle device
66 relay pipe
68 throttle valve case
70 water cooling case
72 exhaust pipe
73 flexible tube
77 throttle outlet side pipe
78 throttle inlet side pipe
94 machine body frame
95 support member
96 support member
97 support frame
98 sensor placing table
99 fastening part

The invention claimed is:

1. An engine device mounted in a work machine in which an operator's seat is disposed on a bonnet disposed in a rear part of a traveling machine, the work machine having a machine body frame that supports an engine disposed in the bonnet of the work machine, the engine device comprising:
   the engine, including an exhaust manifold, a cooling fan, and an output shaft;
   an exhaust gas purification device for purifying exhaust gas of the engine;
   a heat exchanger positioned to face the cooling fan and being disposed in a rear part of the engine in a rear part inside the bonnet; and
   a support frame that couples the exhaust gas purification device and heat exchanger to the machine body frame;
   wherein the exhaust gas purification device is positioned so that an exhaust gas flow direction thereof crosses a longitudinal direction of the output shaft of the engine, and the exhaust gas purification device is positioned under the heat exchanger;
   wherein the exhaust manifold of the engine is connected to an exhaust gas inlet side of the exhaust gas purification device via an exhaust pipe; and
   wherein each one of the exhaust gas purification device and the heat exchanger is directly connected to the support frame, which support frame in turn is connected to the machine body frame, the exhaust gas purification device being suspended from the support frame.

2. The engine device according to claim 1, further comprising a counterweight disposed behind the bonnet of the traveling machine body and the exhaust gas purification device for purifying exhaust gas of the engine, wherein
   the exhaust gas purification device is disposed under and between the counterweight and the engine,
   said heat exchanger is one of a plurality of heat exchangers disposed to face a cooling fan disposed in a rear part of the engine in a rear part inside the bonnet, and
   the heat exchangers are aligned in an ascending order of heat release amount toward a discharge direction of cooling air by the cooling fan, while the exhaust gas purification device is positioned under the heat exchangers.

3. The engine device according to claim 1, wherein the exhaust manifold of the engine is connected to the exhaust gas inlet side of the exhaust gas purification device via the exhaust pipe, and the exhaust pipe is partially formed of a flexible tube.

4. The engine device according to claim 1, wherein the exhaust gas purification device is connected to an engine leg attaching part in a rear part of the engine.

5. The engine device according to claim 1, further comprising: an exhaust gas temperature increasing mechanism for increasing temperature of the exhaust gas flowing to the exhaust gas purification device disposed in a middle part of the exhaust pipe.

6. The engine device according to claim 1, wherein an air cleaner for cleaning air taken into the engine and the exhaust pipe are disposed respectively on the left and right sides of the heat exchanger in the bonnet.

7. The engine device according to claim 1, wherein the support frame comprises a lower support bracket connected to a lower side of the heat exchanger, and wherein the exhaust gas purification device comprises a leg fastened to the support frame.

* * * * *